3,555,106
PROCESS FOR SELECTIVE HYDROGENATION OF ACETYLENIC HYDROCARBONS IN A DIOLEFINIC HYDROCARBON FRACTION, AND CATALYST THEREFOR
Tadashi Ohmori, Kawasaki-shi, Japan, assignor to Nippon Oil Company Limited, Tokyo, Japan
Filed Dec. 20, 1967, Ser. No. 692,120
Claims priority, application Japan, Dec. 20, 1966, 41/82,959
Int. Cl. B01j *11/22;* C01b *33/28;* C07c *7/00*
U.S. Cl. 260—681.5
14 Claims

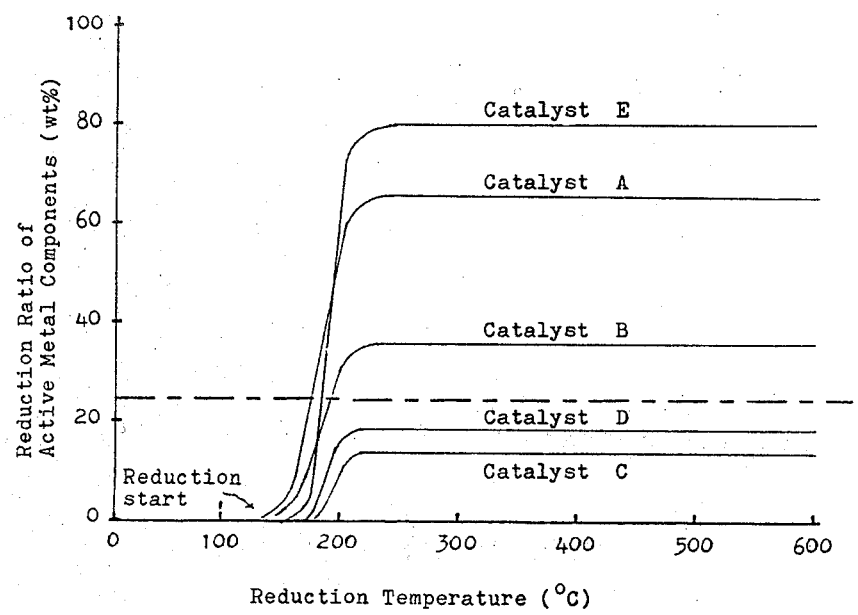
Combined ratio = 75%, i.e.,
Reduction ratio = 25%
TADASHI OHMORI
INVENTOR United States Patent Office 3,555,106
Patented Jan. 12, 1971

ABSTRACT OF THE DISCLOSURE

The present disclosure provides for a catalyst composition containing an inert catalyst carrier formed by calcining a mixture of alumina and silica at a temperature below 850° C. onto which carrier are dispersed copper and nickel as active metal components, the weight of the copper exceeding the weight of the nickel, the weight of the carrier exceeding the weight of the active metal components, at least 25% by weight of the active metal components being in the metallic state, and the remaining percentage being in the form of their oxides. The present invention also provides for the use of the aforementioned catalyst for selectively hydrogenating acetylenic hydrocarbons.

This invention relates to an improved process for the selective hydrogenation of acetylenic hydrocarbons existing in a diolefinic hydrocarbon fraction, and further to an improved catalyst useful for said hydrogenation reaction.

The actalyst employed for the selective hydrogenation of the acetylenic hydrocarbons is prepared by using copper and nickel as active metal components, and inert substances such as alumina and silica as catalyst carriers, the content of the nickel being less than that of the copper and the weight of said carriers being more than that of said active metal components. The quantity of combined substance of the catalyst is less than 75% by weight against the used metal components. The term "combined substance" herein described denotes the metals employed which are not reduced in a hydrogen stream at a temperature of less than 600° C. in the preliminary reduction step of the catalyst mixture.

In the process of thermal cracking catalytic cracking, or dehydrogenation of petroleum hydrocarbon fractions, hydrocarbon fractions containing a large quantity of diolefinic hydrocarbons, that is, butadiene, isoprene, piperylene and the like, are produced. Although these fractions usually include saturated hydrocarbons, monoolefinic hydrocarbons, and acetylenic hydrocarbons besides diolefinic hydrocarbons, they are used as a raw material for petrochemical products by separating or refining the diolefinic hydrocarbons in accordance with a well known process. In this case, the coexistence of acetylenic hydrocarbons with diolefinic hydrocarbons is extremely undesirable, and it is well known preliminarily to remove acetylenic hydrocarbons for the upgrade of the quality of diolefinic hydrocarbons.

Heretofore, as a process for removing acetylenic hydrocarbons from coexisting diolefinic hydrocarbons, a hydrogenation refining process had been proposed, and this process has been industrially applied.

For example, a selective vapor phase hydrogenation process (U.S. Pat. No. 2,426,604) has been known, in which a catalyst consists essentially of between 85 and 99.5% by weight of copper intimately admixed with between 15 and 0.1% of a different metal, the oxide of which is reducible to the metal with hydrogen at a temperature below 550° C., both of said metals being dispersed on an inert porous supporting material, and the process comprises heating the vapors of a hydrocarbon fraction in the presence of the catalyst at a reaction temperature below 300° C. For example, in Table 1, in Example 1 of said patent, an example is shown in which 50–60% by weight of 1,3-butadiene, 38–45% by weight of butenes, about 2% by volume of acetylenic hydrocarbons, and about 4% by volume of hydrogen are used as a raw gas, and a binary mixed catalyst consisting of copper and another metal selected from the group consisting of nickel, silver, cadmium, titanium, iron, vanadium, zinc, etc. is used, and in this case, about 2% by volume of acetylenic hydrocarbons in the raw material are decreased to approximately 0.01%–0.08% by volume therein after the reaction.

Furthermore, in Table 2 in Example 2 of the above-mentioned specification, another example is shown in which a binary mixed catalyst consisting of copper and another metal selected from the group consisting of cobalt, molybdenum, manganese, chromium, iron, etc. is used, and in this case, about 2% by volume of acetylenic hydrocarbons in the raw material are decreased to approximately 0.02% by volume therein.

However, these processes as mentioned above have such disadvantages as that when the acetylenic hydrocarbons are subjected to hydrogenation, at the same time, conjugated diolefinic hydrocarbons such as butadiene are also subjected to hydrogenation, and consequently, the loss of useful materials is increased, and that the activity of the catalyst is apt to decrease as fully described in Example 1 of the present application.

Further, a process has been proposed (British Patent No. 912,444), in which active metals containing copper activated by the presence of at least one metal of the group consisting of iron, nickel, ruthenium, rhodium, palladium, iridium, and platinum are finely dispersed on a high surface area (25–300 m.$^2$/g.) activated alumina, are used as a selective hydrogenation catalyst for acetylenic hydrocarbons in the presence of di- and mono-olefinic hydrocarbons. In this case, the total metal content dispersed onto the carrier is 5–20% of weight, and the characteristic feature of this process resides in that at least 0.1% by weight of activated metal against the total metal quantity is included. Further a process is known in which a catalyst made approximately 5% by weight of copper and approximately 0.01–0.08% by weight of nickel supported on activated alumina (95% by weight) is employed to carry out selective hydrogenation of acetylenic hydrocarbons by using a $C_4$ fraction (including butane, butene, and butadiene) as the raw material. However, in this process, the period of use of said catalyst for the reaction was short, i.e. about 35 hours at the most, and nothing is known with respect to the behavior of the catalyst for more than 35 hours in any of the above-mentioned processes.

Accordingly, as described in detail in Example 1 of the present application, it was found that the above-mentioned copper-nickel series catalyst with activated alumina carrier prepared in accordance with the above-mentioned British Patent, is inferior in its selectivity (as set forth in the Examples of this application), and further that the activity of said catalyst for hydrogenation of acetylenic hydrocarbons is readily decreased.

It is an object of the present invention to overcome the above-described disadvantages, common to the above-mentioned various catalysts comprising copper as a principal constituent, such as inferior selectivity, and susceptibility to decrease of the hydrogenation activity for acetylenic hydrocarbons.

The present invention provides novel catalysts having an excellent adaptability as industrial catalysts, as compared with conventional catalysts.

The catalysts of the present invention are catalysts for the vapor phase hydrogenation of acetylenic hydrocarbons in admixture with diolefinic and monoolefinic hydrocarbons. The characteristic features of the catalysts of this invention are that the hydrogenation activity for acetylenic hydrocarbons is high at a low temperature, the selectivity is excellent, loss of diolefinic hydrocarbons is scarcely recognized, and further, the durability of the hydrogenation activity for acetylenic hydrocarbons is extremely remarkable. Accordingly, the catalysts of the present invention are unique and excellent in comparison with prior comparable catalysts.

The active metal component in the catalysts of this invention comprises copper and nickel as the princpal components, the content of nickel being less than that of the copper. The catalysts of this invention can be obtained by causing copper and nickel to be dispersed and supported on the carrier, the quantity of combined substance being 75% by weight or less relative to the metal content of the catalyst. The term "combined substance" herein described denotes the metals employed which are reduced in a hydrogen stream at a temperature of less than 600° C. in the preliminary reduction step of the catalyst mixture.

For the raw material of the catalyst carrier of the present invention, alumina or compounds easily changeable into alumina by baking such as hydrated alumina, etc. and diatomaceous earth, or natural or synthetic silica-containing products such as silica gel are employed. The quantity of said siliceous material is 5% by weight or more relative to the quantity of said alumina. These raw materials are baked generally at a temperature within the range of from 150° C. to 1400° C. for 1–20 hours thereby to obtain the carrier of this invention. The alumina constituent and silica constituent which are the components of said carrier can be previously baked before admixing together or can be baked after admixing, and in the latter case, it is preferable to bake the pepared admixture at a temperature of 850° C. or less. Further, if necessary, alkali metal compounds or alkaline earth metal compounds can be added thereto.

The surface area and pore volume of the carrier can be varied in accordance with the ratio of alumina and silica or diatomaceous earth. However, it is preferable for attaining the objects of the present invention to make the surface area within the range of from 10 m.$^2$/g. to 250 m.$^2$/g. and the pore volume within the range of from 0.02 cc./g. to 2.0 cc./g.

In the process for the production of the catalysts according to this invention, generally copper salts and nickel salts are separately applied on the carrier in the form of an aqueous solution or aqueous ammonia solution thereof as the means for applying the active metals onto the carrier. However, other processes may be employed such as a process of impregnating a mixed solution of active metals into the carrier, a kneading process, a co-precipitation process, or a precipitation process, etc. However the employment of the impregnating process or kneading process is preferable.

It is necessary to bake the catalyst according to the present invention in the presence of air and nitrogen or in the presence of air alone at a temperature of from that at which active metal salts or active metal hydroxides become oxides thereof, to 800° C. for 1–20 hours. Further, it is necessary that the copper-nickel binary mixed catalyst of the present invention be subjected to a preliminary reduction with hydrogen prior to the hydrogenation reaction. On the other hand, the characteristic feature of the copper-nickel-alumina catalyst according to British Patent No. 912,444 resides in a reduction at a temperature of 250–350° C. The catalyst according to the present invention is influenced in hydrogenation activity, selectivity and durability of acetylenic hydrocarbons by the temperature of the preliminary reduction with hydrogen. Referring to the catalyst of this invention, the objective use can be carried out at a temperature of generally 180° C. or above, and particularly it is preferable to carry out the preliminary reduction with hydrogen at a temperature in the range of from 350 to 430° C.

The selective hydrogenation of acetylenic hydrocarbons existing in the fraction of diolefinic hydrocarbons employed according to this invention can be applied for the hydrogenation of substituted acetylenes such as methylacetylene, vinylacetylene, ethylacetylene, dimethylacetylene, isopropylacetylene, valylene, n-propylacetylene, allylacetylene, etc. in admixture with diolefinic and monoolefinic hydrocarbons having 4–5 carbon atoms.

The hydrogenation reaction is generally carried out at a temperature of from 100° C. to 250° C. Referring to the quantity of hydrogen to be added to the reaction gas, it is necessary to use generally at least an equivalent of hydrogen with respect to the acetylenic hydrocarbons to be hydrogenated, and it is preferable that the reaction pressure be 5 kg./cm.$^2$ g. or less. Regarding the contact time, it is necessary to vary this in accordance with the quantity of acetylenic hydrocarbons in the raw gas, and generally a gas space velocity (supplying volume at N.T.P. of raw gas per unit time and unit volume of catalyst) is suitable in a value of from 200 to 500/hr.

The present invention is further specifically illustrated by the following examples and attached diagram showing reduction of various catalysts. In the examples, "cc." designates cubic centimeters, "g." designates grams, "mm." designates millimeters, and "p.p.m." designates parts per million; "hr." designates hour(s).

EXAMPLE 1

(1) Process for the preparation of catalyst

The copper-nickel binary catalyst of the present invention is prepared as follows.

Into 1500 cc. of distilled water, 23.4 g. of nickel nitrate (0.6% by weight as nickel oxide) and 182.2 g. of copper nitrate (6.0% by weight as copper oxide) are dissolved. A paste-form mixture obtained by previously admixing 467 g. of powdery diatomaceous earth, 417 g. of activated alumina which has been baked at a temperature of 500° C. for 4 hours, and 50 g. of calcium aluminate, as a binder, with a proper quantity of water is thoroughly kneaded. After the drying of said mixture by heating on a steam bath, the so-dried mixture is baked in air at a temperature of 300° C. for 3 hours. The so-obtained solids is pulverized, then 3% by weight of graphite is added thereto, and the resulting mixture is molded into tablets each of which is 3 mm. in diameter and 2 mm. in length.

The thus-obtained tablets are baked in air at a temperature of 600° C. for 15 hours, and then 50 g. of the baked tablets are packed into a pressure reaction tube made of stainless steel and having an inner diameter of 20 mm. Before use of the catalyst for a reaction, the packed tablets are first subjected to hydrogen reduction with hydrogen gas at a gas space velocity of 300/hr. (N.T.P.) at a temperature of 400° C. for 8 hours to obtain the catalyst proper, and this catalyst is designated as catalyst A.

Next, for comparison, a copper- (4.9% by weight), nickel- (0.08% by weight) activated alumina (tablet having a diameter of 3 mm. and a length of 2 mm.) supported catalyst is prepared as follows in accordance with Example 1 of British Patent No. 912,444. A sufficient quantity of ammonia is added to copper acetate and nickel acetate aqueous solution, and a prescribed quantity of gamma-alumina (surface area of 200 m.$^2$/g.) is immersed therein. The resulting mixture is dried at a temperature of 120° C. for 4 hours, and then the so-dried mixture is baked at a temperature of 350° C. for 10 hours while supplying 10% by volume of air diluted by nitrogen to obtain a catalyst as indicated in the example of the above-mentioned British patent. A preliminary hydrogen reduction of the catalyst is carried out with hydrogen (10% by volume) diluted by steam at a gas space velocity of 300/hr. (N.T.P.) and at a temperature of 290° C. for 8 hours, and this catalyst is designated as catalyst B.

Furthermore, in the process of preparing catalyst A, only alumina hydrogel is used instead of the mixture consisting of diatomaceous earth, activated alumina, and calcium aluminate, whereby a copper-nickel catalyst of the same composition as that of catalyst A is prepared. The alumina hydrogel herein used is prepared by the following method, that is, 4-normal aqueous ammonia solution is slowly added to 10% by weight of aluminum nitrate aqueous solution at room temperature until the solution attains pH 9, and the resulting precipitate is filtered off and rinsed after standing for about 24 hours to obtain the alumina hydrogel. The baking condition in air and the condition for preliminary hydrogen reduction are the same as those in the case of catalyst A, and this catalyst was designated as catalyst C.

Next, in the process for the preparation of catalyst A, a catalyst of copper-nickel supported on silica having the same composition as those of the above catalysts is prepared by using silica hydrosol instead of a mixture consisting of diatomaceous earth, activated alumina, and calcium aluminate, said silica hydrosol being prepared by removing sodium ion from water glass with an ion-exchange resin. The baking condition and the condition for preliminary hydrogenation relating to this catalyst in air are same as in the case of catalyst A, and this catalyst is designated as catalyst D.

Further, in accordance with Example 1 of the process of preparing catalyst disclosed in the U.S. Patent No. 2,426,604 1500 cc. of aqueous solution of a mixture comprising 626 g. of copper nitrate (20.6% by weight as nickel oxide), and 28.1 g. of nickel nitrate (0.72% by weight as nickel oxide) is impregnated into 786.8 g. of infusorial earth (Celite). After leaving the so-impregnated mixture at room temperature for one night, the mixture is heated with a steam bath to dry it, and then, the so-dried mixture is heated at a temperature of 650° C. for 4 hours thereby to change nitrates in said mixture into oxides. Thereafter, the resulting catalyst is subjected to a preliminary hydrogen reduction at a temperature of 320° C. for 6 hours in accordance with the manner shown in the example of the above-mentioned U.S. patent, and this catalyst is designated as catalyst E.

Next, in accordance with the procedure described in Example 3 in the specification of Japanese patent publication No. 16,370/1966, 5% (as $Al_2O_3$) of bauxite with respect to the quantity of diatomaceous earth is added to said diatomaceous earth, further, water is added thereto, the resulting mixture is kneaded, the so-kneaded mixture is molded into cylinders 5 mm. x 5 mm., and these molded articles are baked at a temperature of 1050° C. for 5 hours thereby to obtain a carrier. Into 1500 cc. of an aqueous solution of a mixture comprising 486 g. of copper nitrate (16% by weight as copper oxide) and 62.4 g. of nickel nitrate (1.6% by weight as nickel oxide), 842 g. of this carrier is immersed and stood still for one night. Then, water is removed from said aqueous solution to dry the mixture, and the so-dried mixture is baked at a temperature of 550° C. for about 10 hours to obtain the catalyst. Thereafter, the catalyst is subjected to a preliminary hydrogen reduction at a temperature of 400° C. for 8 hours, and this catalyst is designated as catalyst F.

(2) Hydrogenation reaction

The composition of the $C_4$ fraction, which was obtained by the thermal cracking of light naphtha fraction, used in the present example is as shown in the following Table 1.

TABLE I

| Components | Raw gas (mol. percent) | After reaction * (mol. percent) |
|---|---|---|
| Propane | 0.2 | 0.2 |
| Propylene | 1.5 | 1.5 |
| n Butane | 7.0 | 7.1 |
| iso Butane | 1.6 | 1.6 |
| Butene 1 | 43.2 | 43.9 |
| cis Butene 2 | 4.5 | 4.6 |
| trans Butene 2 | 6.3 | 6.4 |
| 1,3 butadiene | 33.5 | 33.8 |
| 1,2 butadiene | 0.1 | 0.1 |
| Pentane fraction | 0.1 | 0.1 |
| Hydrogen | 1.4 | 0.7 |
| Vinyl acetylene (p.p.m.) | 2,900 | Trace |
| Methyl acetylene (p.p.m.) | 2,000 | Trace |
| Ethyl acetylene (p.p.m.) | 1,100 | 10 |
| Total acetylenes (p.p.m.) | 6,000 | 10 |

* The composition of the reaction gas after the period of 200 hours with catalyst A.

Referring to the above-mentioned catalysts A, B, C, D, E and F, selective hydrogenation reaction of acetylenic hydrocarbons in a $C_4$ fraction is carried out at a prescribed temperature, under a pressure of 1 kg./cm.² g., and at a gas space velocity of 300 (liters/liters/hr., N.T.P.), and the principal results are shown in ahe following Table 2.

TABLE 2

| Catalyst | Composition of catalyst CuO (wt. percent) | Composition of catalyst NiO (wt. percent) | Composition of carrier SiO₂ (wt. percent) | Composition of carrier Al₂O₃ (wt. percent) | Baking Temp. (° C.) | Baking Time (hr.) | H₂ prereduction Temp. (° C.) | H₂ prereduction Time (hr.) | Reaction Temperature (° C.) | Residual of C₄ acetylenes (p.p.m.) ¹ | Durability of activity (hr.) ² |
|---|---|---|---|---|---|---|---|---|---|---|---|
| A | 6 | 0.6 | ³ 46.7 | ³ 46.7 | 600 | 15 | 400 | 8 | 150 | <10 | 420 |
| B | 4.9 | 0.08 |  | 95.1 | ⁴ 350 | 10 | ⁵ 290 | 8 | 150 | 25 | 17 |
| C | 6 | 0.6 |  | 93.4 | 600 | 15 | 400 | 8 | 125 | 350 |  |
| D | 6 | 0.6 | 93.4 |  | 600 | 15 | 400 | 8 | 150 / 200 | 290 / 75 | 15 |
| E | 20.6 | 0.72 | ⁶ 78.7 |  | 650 | 4 | 320 | 6 | 180 / 200 | 25 / 30 | 25 / 20 |
| F | 10.0 | 1.5 | ³ 84.1 | ⁷ 4.4 | 550 | 10 | 400 | 8 | 160 | 1,500 |  |

¹ Values of residual quantities of acetylenic hydrocarbons after 10 hr. reaction from the start or from the change of conditions.
² Catalyst life per one cycle.
³ Diatomaceous earth.
⁴ 10% air diluted with nitrogen was supplied.
⁵ 10% hydrogen diluted with steam was supplied.
⁶ Celite.
⁷ Bauxite.

NOTE.—Reaction conditions: Pressure, 1 kg./cm.² g.; Gas space velocity, 300/hr. (N.T.P.); H₂, 1.4 mol. percent; C₄ acetylenes, 6,000 p.p.m.

Referring to catalyst A of the present invention, the hydrogenation reaction is carried out by using the raw gas in Table 1 at a temperature of 150° C., and the result is as follows:

The residual quantity of $C_4$ acetylenic hydrocarbons after 50 hours from the start of reaction is 7 p.p.m., and the quantity of residual hydrogen is 0.7% by volume. The selectivity of catalyst A is very good, and no tendency of decreasing the activity of the catalyst after 420 hours action in a constant reaction condition is observed.

For comparison, referring to catalyst B, the hydrogenation reaction is carried out by using a raw gas of the same composition as in the case of catalyst A at a reaction temperature of 150° C. The activity of the catalyst B after 10 hours from the start of the reaction is as follows. That is, the residual quantity of acetylenic hydrocarbons is 25 p.p.m., the quantity of residual hydrogen is 0.5% by volume, and the selectivity of the catalyst is comparatively good. However, a tendency to decrease of the activity of said catalyst after a total period of 17 hr. of reaction time is observed, when said hydrogenation reaction is further continued.

Furthermore, for comparison, referring to catalyst C, the hydrogenation reaction is carried out by using a raw gas of the same composition as in the case of catalyst A at a reaction temperature of 125° C. The selectivity of catalyst C is somewhat inferior in the early stage of reaction, the residual quantity of $C_4$ acetylenic hydrocarbons is large (350 p.p.m.), although the quantity of residual hydrogen is only a trace or so, and even when the reaction temperature is caused to further decrease or increase, the acetylenic hydrocarbons can not be made to decrease to a value of 150 p.p.m. or below.

Next, for comparison, referring to catalyst D, the hydrogenation reaction is carried out by using a raw gas of the same composition as in the case of catalyst A at a temperature of 150° C. In this case, the activity of hydrogenation for acetylenic hydrocarbons is remarkably small. When the reaction temperature is elevated from 150° C. to 200° C., the activity of hydrogenation increases, and, as a result, the residual quantity of acetylenic hydrocarbons became 75 p.p.m. However, a tendency to rapid decrease in hydrogenation activity for acetylenic hydrocarbons after a total period of about 15 hrs. from the start of the reaction is observed, when said catalyst is continuously used.

Moreover, for comparison, referring to catalyst E, the hydrogenation reaction is carried out by using a raw gas of the same composition as in the case of catalyst A at a temperature of 180° C.

In this case, a comparatively desirable activity of the catalyst such as that the residual quantity of acetylenic hydrocarbons is 25 p.p.m., and the quantity of residual hydrogen is 0.3–0.5% by volume, could be observed. However, the tendency the activity of the catalyst to decrease after a total period of about 25 hours from the start of the reaction is observed. When the reaction temperature is raised to 200° C., the activity of the catalyst slightly increases, but when the reaction is further continued, the activity of the catalyst decreases after the lapse of about 20 hours.

Next, referring to catalyst F, the hydrogenation reaction is carried out by using a raw gas of the same composition as in the case of catalyst A at a temperature of 160° C.

While the residual quantity of acetylenic hydrocarbons is 1500 p.p.m., i.e. of a very high value, the quantity of residual hydrogen is trace, and therefore, the selectivity of the catalyst is extremely inferior. Furthermore, even when the reaction temperature is caused to vary, it is impossible to decrease the residual quantity of acethylenic hydrocarbons below 1000 p.p.m.

As the above results show, the cases of catalysts B, C, D, E and F were inferior, respectively, in comparison with catalyst A of the present invention in hydrogenation activity, selectively, and durability of activity relating to acetylenic hydrocarbons, and further, it is apparent from the accompanying drawing and the above-mentioned specific examples that the superiority of the catalyst A of this invention with respect to said other catalysts results from the combined ratio of active metal components and carriers, which is influenced by the kinds of carriers of catalysts and conditions for preparing them.

The accompanying drawing is a graphical representation showing the situation of the case in which the catalyst A of copper-nickel catalyst according to this invention and various related catalysts B, C, D and E are subjected to hydrogen treatment by using a thermobalance equipment while elevating the temperature. In this drawing, the value of the reduction ratio of a substance to be reduced means the total quantity of the activated metallic constituents consisting of copper and nickel which are reduced by hydrogen into each metal element.

The differences of reduction ratios of the substances to be reduced which are recognized among the kinds of carriers and the methods of catalyst preparations are due to the quantities of combined substances formed between the active metal components and catalyst carriers, and it is seen that the C and D catalysts have a much greater content of active metal components combined with the carriers than that of catalyst A. On the other hand, referring to catalysts B and E, the differences between the above reducing ratio are not based on the combined ratios of carriers and active metal components, but rather on the fact that the catalyst carrier of catalyst B is alumina and that of catalyst E is Celite while the catalyst carrier of catalyst A is composed of alumina and silica.

EXAMPLE 2

(1) Process for the preparation of catalyst (1) A copper-nickel binary catalyst according to the present invention is prepared as follow.

Into 1000 cc. of distilled water, 97.3 g. of nickel nitrate (2.5% by weight as nickel oxide) and 456 g. of copper nitrate (15% by weight as copper oxide) are dissolved then 500 cc. of 28% aqueous ammonia is added thereto to obtain hydroxides. Next, to a paste-form mixture obtained by thoroughly admixing 413 g. of activated alumina powder (surface area being 250 m.$^2$/g.) which had been previously baked at a temperature of 400° C. for 5 hours, 360 g. of diatomaceous earth, and 52 g. of bentonite with water; the above-mentioned hydroxides are blended and thoroughly kneaded. The resulting mixture is heated with a steam bath for several hours to adjust the moisture content thereof (moisture content being approximately 55%), then the so-obtained mixture is subjected to extrusion molding, each of the resulting molded articles having a diameter of 3 mm. These molded articles are dried at room temperature for one night, and then the so-dried articles are baked in air at a temperature of 550° C. for 20 hours to obtain a catalyst. Before the use of the catalyst for a reaction, the catalyst is previously reduced by using hydrogen gas at a gas space velocity of 300/hour at a temperature of 280° C. and 415° C., respectively, for each 8 hours, and the catalyst which has been reduced at the former temperature and the catalyst at the latter temperature are designated as catalysts G and H, respectively.

(2) Furthermore, a copper-nickel binary catalyst according to the present invention is prepared as follows.

That is, 47.5 g. of nickel sulfate are dissolved in 1 liter of distilled water, and 785 g. of copper sulfate is dissolved in 9 liters of distilled water, and these solutions are mixed together. Into said mixed solution, 500 g. of diatomaceous earth is added and then heated at a temperature of 70° C. with stirring. Into the above-prepared solution, 10 liters of 3% by weight sodium hydroxide solution is added slowly, and then it is aged for 1 hour at 70° C. The thus-obtained precipitate is filtered off and rinsed, and is admixed with 1000 g. of activated alumina and 620 g. of silica gel. After drying at between 100° C. and 120° C., the mixture is molded to form pellets of 3 mm. in diameter. These pellets are divided equally and one half of them are baked in air at a temperature of 350° C. for 15 hours and another half of them are baked in air at a temperature of 600° C. for 5 hours to obtain catalysts.

Before the use of the catalysts for the reaction, these catalysts are previously subjected to preliminary hydrogen reduction at a temperature of 400° C. for 5 hours, and the catalyst in the case in which the baking temperature in air is 350° C. is designated as catalyst I and the catalyst in the case of the baking temperature of 600° C. is designated as catalyst J. The results relating to the above-mentioned catalysts are shown together in the following Table 3.

TABLE 3

| Catalyst | Composition of catalyst | | Composition of carrier | | Baking | | $H_2$ prereduction | | Reaction Temperature (° C.) | Residual of $C_4$ acetylenes (p.p.m.)[1] | Durability of activity (hr.) |
|---|---|---|---|---|---|---|---|---|---|---|---|
| | CuO (wt. percent) | NiO (wt. percent) | $SiO_2$ (wt. percent) | $Al_2O_3$ (wt. percent) | Temp. (° C.) | Time (hr.) | Temp. (° C.) | Time (hr.) | | | |
| G | 15 | 2.5 | 41.2 | 41.3 | 550 | 20 | 280 | 8 | 130 | 15 | 205 |
| | | | | | | | | | 150 | 8 | 185 |
| H | 15 | 2.5 | 41.2 | 4.13 | 550 | 20 | 415 | 8 | 150 | 8 | ≧400 |
| I | 10.5 | 0.57 | 47.0 | 42.0 | 350 | 15 | 400 | 5 | 125 | 7 | ≧175 |
| J | 10.5 | 0.57 | 47.0 | 42.0 | 600 | 5 | 400 | 5 | 140 | 11 | ≧295 |

[1] Results after 100 hr. reaction.

(2) Hydrogention reaction

Referring to the catalysts G, H, I, and J according to the present invention, hydrogenation reaction (pressure 2 kg./cm.$^2$g., gas space velocity 350/hr.) was carried out by using the raw gas of Table 1, and the results thereof were as follows:

The principal results of reaction were shown in Table 3.

Referring to catalyst G, the hydrogenation activity of acetylenic hydrocarbons was high at a reaction temperature of 130° C., accordingly, the residual quantity of $C_4$ acetylenic hydrocarbons after the total period of 100 hrs. was 15 p.p.m., the quantity of residual hydrogen was 0.4% by volume, the durability of activity was 205 hours under a constant condition, and, thereafter, the residual quantity of acetylenic hydrocarbons gradually increased.

Then, when reaction temperature was elevated to 150° C., the activity of said catalyst again increased, consequently, the residual quantity of acetylenic hydrocarbons was 8 p.p.m., the quantity of residual hydrogen was 0.2% by volume, and the activity of catalyst G continued for 185 hrs.

Referring to catalyst H, the activity of the catalyst after the total period of 100 hr. at a reaction temperature of 150° C. was indicated by such as that the residual quantity of acetylenic hydrocarbons was 8 p.p.m., the quantity of residual hydrogen was 0.4% by volume, and the durability of activity was 400 hr. or more.

Referring to catalyst I, the activity of the catalyst after the total period of 100 hr. at a reaction temperature of 125° C. was indicated by such as that the residual quantity of acetylenic hydrocarbons was 7 p.p.m., the quantity of residual hydrogen was 0.4% by volume, and the durability of activity was 175 hr. or more.

Referring to catalyst J, the activity of said catalyst after the total period of 100 hours at a reaction temperature of 140° C. is indicated by the fact that the residual quantity of acetylenic hydrocarbons is 11 p.p.m., the quantity of residual hydrogen is 0.5% by volume, and the durability of activity is 295 hours or more.

Further, the catalysts G, H, I and J of the present invention are treated with hydrogen while raising the temperature with thermobalance to measure the ratio of combination between active metals and carrier. The reduction ratio of the material to be reduced of the catalysts G and H is in both cases 85% by weight, and those of the catalyst I and J are 80% and 65% by weight, respectively. Accordingly, it is understood that the combination between the active metals and the carrier was strengthened in proportion to the rise of the temperature.

In the above results, it has been demonstrated that the catalysts of the present invention are extremely excellent as catalysts for the selective hydrogenation of acetylenic hydrocarbons in the co-presence of diolefinic hydrocarbons, wherein said catalysts are obtained in such manner that a mixture comprising silica and alumina as principal constituents is employed as a carrier, and also whereby copper and nickel are employed as active metals on the surface of said carrier, in the amounts previously described.

EXAMPLE 3

The composition of a $C_5$ fraction, which was obtained by the thermal cracking of a light naphtha fraction, used in the present invention is shown in the following Table 4.

TABLE 4

| Components | Raw gas (mol. percent) | Products[1] (mol. percent) |
|---|---|---|
| Isoprene | 23.3 | 24.5 |
| n-Pentane | 4.9 | 5.2 |
| 2-methylbutene-2 | 3.2 | 3.5 |
| 2-methylbutene-1 | 50.3 | 51.2 |
| 3-Methylbutene-1 | | |
| Pentene-2 | 10.1 | 10.3 |
| Cyclopentadiene | 1.7 | 1.5 |
| Piperylene | 2.9 | 3.2 |
| $C^5$ acetylenes | 1.2 | 0.0075 |
| Hydrogen | 2.4 | 0.9 |

[1] Reaction gas after 55 hours reaction.

The selective hydrogenation of acetylenic hydrocarbons in the above $C_5$ fraction is carried out at a reaction temperature of 140° C., under ordinary pressure, and at a gas space velocity of 300/hr. The catalyst used in this example was catalyst A.

The analytical results of the products after 55 hours from the start of the reaction are shown in Table 4, and in which the residual quantity of $C_5$ acetylenic hydrocarbons is 0.0075 mol. percent the quantity of residual hydrogen is 0.9 mol. percent and the durability of activity is 250 hours or more.

It should be understood that the foregoing disclosure relates to only general features and illustrative specific examples of the invention and that the disclosure is intended to cover all changes and modifications of the examples of the invention herein described for purposes of explanation, which changes do not constitute departures from the spirit and scope of the invention as set forth in the appended claims.

What is claimed is:

1. A catalyst composition suitable for use in the selective hydrogenation of acetylenic hydrocarbons, comprising an inert catalyst carrier formed by calcining a mixture of alumina and silica at a temperature below 850° C., on which are dispersed as active metal components copper and nickel, the weight of the copper exceeding the weight of the nickel, the weight of the carrier exceeding the weight of the active metal components, at least 25% by weight of the active metal components being in the metallic state, and the remaining percentage being in the form of their oxides.

2. A catalyst composition as claimed in claim 1 wherein the weight of the silica is at least 5% of that of the alumina.

3. A catalyst composition as claimed in claim 1 wherein the pore volume is from 0.02 to 2 cc./g.

4. A catalyst composition as claimed in claim 1, wherein the surface area is in the range of from 10 to 250 m.$^2$/g.

5. A catalyst composition as claimed in claim 1, wherein the catalyst is in the form of tablets.

6. In a process for the selective hydrogenation of acetylenic hydrocarbons, in the presence of diolefinic hydrocarbons, the improvement which comprises utilizing a catalyst composition prepared by dispersing the active metal components copper and nickel on an inert catalyst carrier formed by calcining a mixture of alumina and silica at a temperture below 850° C., the weight of the copper exceeding the weight of the nickel, the weight of the carrier exceeding the weight of the active metal components, baking the carrier and the active metal components dispersed thereon in the presence of oxygen at a temperature of from that at which the active metal components are converted into their oxides to 800° C., and thereafter reducing the baked composition with a hydrogen-containing gas at a temperature in the range of from 180° C. to 600° C. in such a way that at least 25% by weight of the active metal components are reduced to the metallic state, the remaining percentage of the active metal components remaining in the form of their oxides, whereby the desired catalyst composition is produced.

7. The improvement according to claim 6 wherein the alumina is crystalline alumina, activated alumina, hydrated alumina or bauxite, and the silica is silica gel or kieselguhr.

8. The improvement according to claim 7, wherein the weight of the silica is at least 5% of the weight of the alumina.

9. The improvement according to claim 6, wherein the partial reduction of the oxides is effected at a temperature in the range of from 350° C. to 430° C.

10. The improvement according to claim 6, wherein the active metal components are derived from their nitrate and/or sulphate salts.

11. The improvement according to claim 6, wherein the hydrogenation is effected at a temperature in the range of from 100 to 250° C.

12. The improvement according to claim 6, wherein the hydrogenation is effected at a pressure of less than 5 kg./cm.$^2$.

13. The improvement according to claim 6, wherein the gas space velocity as hereinbefore defined during the hydrogenation is in the range of from 200 to 500/hour.

14. A process for the production of a catalyst composition suitable for use in the selective hydrogenation of acetylenic hydrocarbons which comprises dispersing the active metal components copper and nickel on an inert catalyst carrier formed by calcining a mixture of alumina and silica at a temperature below 850° C., the weight of the copper exceeding the weight of the nickel, the weight of the carrier exceeding the weight of the active metal components, baking the carrier and the active metal components dispersed thereon in the presence of oxygen at a temperature of from that at which the active metal components are converted into their oxides to 800° C., and thereafter reducing the baked composition with a hydrogen-containing gas at a temperature in the range of from 180° C. to 600° C. in such a way that at least 25% by weight of the active metal components are reduced to the metallic state, the remaining percentage of the active metal components remaining in the form of their oxides, whereby the desired catalyst composition is produced.

References Cited

UNITED STATES PATENTS

| | | | |
|---|---|---|---|
| 2,426,604 | 9/1947 | Frevel | 260—681.5 |
| 3,076,858 | 2/1963 | Frevel et al. | 260—677 |
| 3,200,167 | 8/1965 | Reich | 260—681.5 |

FOREIGN PATENTS

| | | | |
|---|---|---|---|
| 912,444 | 12/1962 | Great Britain | 260—681.5 |

DELBERT E. GANTZ, Primary Examiner

G. E. SCHMITKONS, Assistant Examiner

U.S. Cl. X.R.

252—455, 459, 474